United States Patent [19]

Ohno et al.

[11] Patent Number: 5,780,571
[45] Date of Patent: Jul. 14, 1998

[54] NAPHTHALENE RING-CONTAINING RESINS, RESIN COMPOSITIONS AND CURED PRODUCTS THEREOF

[75] Inventors: Hiroaki Ohno, Tokyo; Hiromi Morita, Urawa; Shigeru Moteki, Annaka; Yasumasa Akatsuka, Urawa, all of Japan

[73] Assignee: Nippon Kayaku Kabushiki Kaisha, Tokyo, Japan

[21] Appl. No.: 879,080

[22] Filed: Jun. 19, 1997

Related U.S. Application Data

[63] Continuation of Ser. No. 631,906, Apr. 12, 1996, abandoned, which is a continuation of Ser. No. 343,527, filed as PCT/JP94/00445, Mar. 18, 1994 published as WO94/21707, Sep. 29, 1994, abandoned.

[30] Foreign Application Priority Data

Mar. 22, 1993 [JP] Japan .................................. 5-90955

[51] Int. Cl.$^6$ ............................................ C08G 59/14
[52] U.S. Cl. ............................ 528/97; 528/153; 525/481; 525/482; 523/443; 523/466; 568/719
[58] Field of Search ..................... 549/560; 528/97, 528/153; 525/481, 482; 523/443, 466; 568/719

[56] References Cited

U.S. PATENT DOCUMENTS

| | | | |
|---|---|---|---|
| 3,437,695 | 4/1969 | Kruse | 260/613 |
| 3,632,555 | 1/1972 | Harris et al. | 260/47 |
| 5,068,293 | 11/1991 | Kaji et al. | 525/534 |
| 5,223,602 | 6/1993 | Kaji et al. | 525/534 |
| 5,298,548 | 3/1994 | Shiobara et al. | 523/443 |
| 5,334,674 | 8/1994 | Naka et al. | 525/481 |

FOREIGN PATENT DOCUMENTS

| | | |
|---|---|---|
| 62522 | 1/1987 | Japan . |
| 63251419 | 10/1988 | Japan . |
| 63-264622 | 11/1988 | Japan . |

*Primary Examiner*—Frederick Krass
*Attorney, Agent, or Firm*—Nields, Lemack & Dingman

[57] ABSTRACT

This invention provides resins and resin compositions which afford cured products with high heat resistance, low water absorption and high adhesion which are useful as electric and electronic materials. Resins obtained by condensation reaction between 4,4'-di(ω-substituted methyl)biphenyl or the like and naphthols; epoxy resins obtained by glycidyl-eterifying said resins; epoxy resin compositions containing these resins; and cured products thereof are disclosed.

14 Claims, 1 Drawing Sheet

NAPHTHALENE RING-CONTAINING RESINS, RESIN COMPOSITIONS AND CURED PRODUCTS THEREOF

This application is a continuation of application Ser. No. 08/631,906 filed Apr. 12, 1996 (abandoned), which is a continuation of application Ser. No. 08/343,527, filed as PCT/JP94/00445, Mar. 18, 1994 published as WO94/21707, Sep. 29, 1994, (abandoned).

|TECHNICAL FIELD|

This invention relates to resins with high refractive indices which are useful as sealing and laminating materials for electronic components; resin compositions containing said resins to afford cured products with high heat resistance, low water absorption and good adhesion; as well as the cured products of said resin compositions.

|BACKGROUND ART|

In the field of sealing materials for electric and electronic components, particularly ICs, the resin compositions based on epoxy resins, phenolic novolak resins and cure accelerator have been widely used.

The recent tendency toward high density and high integration of optical elements and ICs has demanded high heat resistance, low water absorption and good adhesion of sealing materials. Especially under rigorous conditions of immersion in soldering bath for high-density packaging of ICs, the demand for high heat resistance, low water absorption and good adhesion of cured products has been more and more increasing.

|PROBLEMS TO BE SOLVED BY THE INVENTION|

However, the cured products of conventional compositions containing cresol novolak-type epoxy resins commonly used as epoxy resins are insufficient in heat resistance under rigorous conditions of immersion in soldering bath. As compounds affording cured products with heat resistance, JPA63-264622 (1988) proposes polyepoxy compounds obtained by epoxidation of polyphenols formed by condensation between phenols and aromatic aldehydes having a phenolic hydroxyl group. However, they are inferior to cresol novolak-type epoxy resins in water absorption and adhesion of the cured products. Phenolic novolak resins commonly used as hardeners are still insufficient in heat resistance and water absorption of the cured products.

This invention provides resins which afford cured products with high heat resistance, low water absorption and good adhesion enough to endure such rigorous working conditions; resin compositions containing said resins; and the cured products thereof.

|DISCLOSURE OF THE INVENTION|

As a result of elaborate studies to develop a resin composition having the above contradictory three properties, i.e. high heat resistance, low water absorption and good adhesion at the same time, the present inventors found that the resins of formula (I) below afford cured products with excellent heat resistance, water absorption and adhesion, and thus completed this invention.

Therefore, this invention relates to:

(1) a resin represented by formula (I):

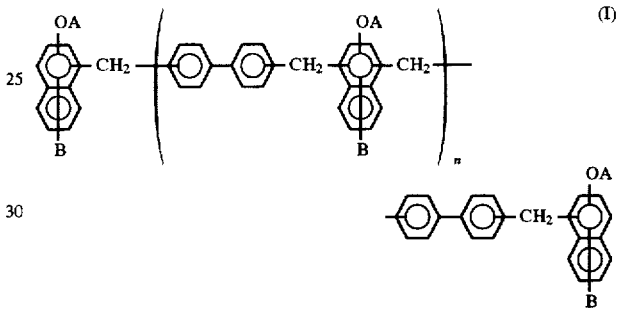

wherein A represents a hydrogen atom or a glycidyl group; B each independently represents a hydrogen atom, halogen atom, hydroxyl group, glycidyloxy group, or lower alkyl or lower alkoxy group containing 5 or less carbon atoms; and n represents a mean value and ranges from 0 to 10;

(2) a resin as defined in (1) above represented by formula (II):

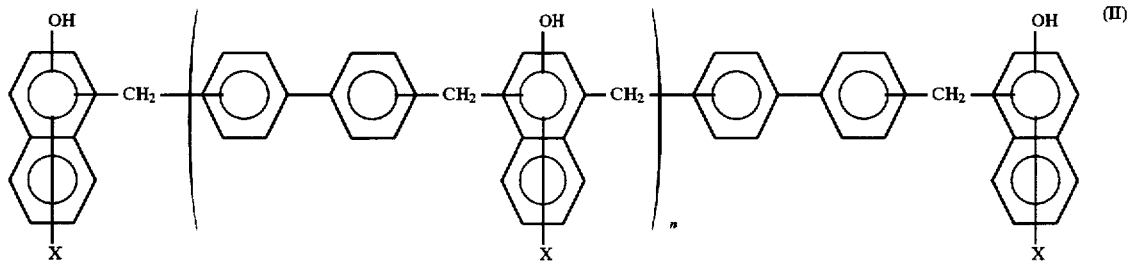

wherein n represents a mean value and ranges from 0 to 10; X each independently represents a hydrogen atom, halogen atom, hydroxyl group, or lower alkyl or lower alkoxy group containing 5 or less carbon atoms;

(3) a resin as defined in (1) above represented by formula (III):

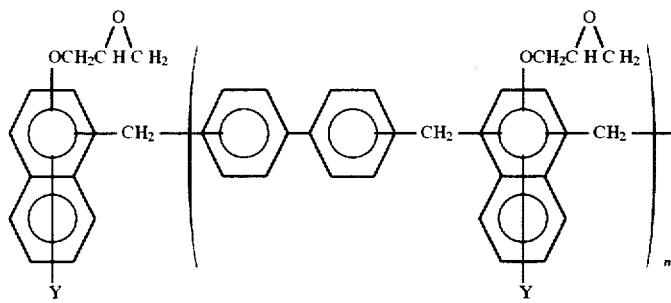 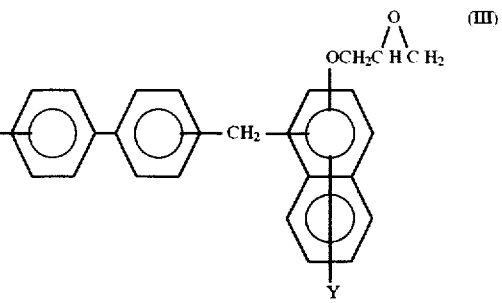 (III)

wherein n represents a mean value and ranges from 0 to 10; Y each independently represents a hydrogen atom, halogen atom, glycidyloxy group, or lower alkyl or lower alkoxy group containing 5 or less carbon atoms;

(4) a resin as defined in (2) above represented by formula (II) as defined in (2) above wherein all of X represent a hydrogen atom;

(5) a resin as defined in (3) above represented by formula (III) as defined in (3) above wherein all of Y represent a hydrogen atom;

(6) an epoxy resin composition comprising:

(A) an epoxy resin, and (B) a resin as defined in (2) above;

(7) an epoxy resin composition comprising:

(A) a resin as defined in (3) above, and (B) a hardener;

(8) an epoxy resin composition comprising:

(A) a resin as defined in (3) above, and (B) a resin as defined in (2) above;

(9) an epoxy resin composition comprising:

(A) an epoxy resin, and (B) a resin as defined in (4) above;

(10) an epoxy resin composition comprising:

(A) a resin as defined in (5) above, and (B) a hardener;

(11) an epoxy resin composition comprising:

(A) a resin as defined in (5) above, and (B) a resin as defined in (4) above;

(12) an epoxy resin composition as defined in (6), (7), (8), (9), (10) or (11) above, further containing a cure accelerator; and

(13) a cured product obtained by curing an epoxy resin composition as defined in (6), (7), (8), (9) , (10), (11) or (12) above.

This invention will now be explained in detail.

In formulae (II) and (III), the value of n is 0 to 10, preferably 0 to 8, more preferably 0 to 4. If n (mean value) exceeds 10, the viscosity increases to deteriorate the workability.

As preferred examples of X and Y in formulae (II) and (III), the halogen atom includes a chlorine atom, bromine atom, etc.; the lower alkyl group includes methyl, ethyl, t-butyl, etc.; and the lower alkoxy group includes methoxy, ethoxy, etc.

The resin of formula (II) according to this invention is obtained by condensing a naphthol with a biphenyl derivative represented by formula (IV):

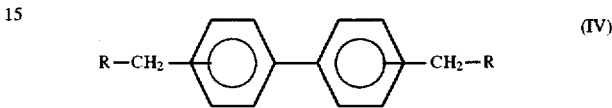 (IV)

wherein R represents a halogen atom, hydroxyl group or lower alkoxy group, if necessary, in the presence of an acid catalyst. Thus obtained resin can be further reacted with an epihalohydrin compound in the presence of a basic compound to give an epoxy resin of formula (III).

First of all, the synthesis of the resin of formula (II) will be explained.

The naphthol includes 1-naphthol, 2-naphthol, 1,7-dihydroxynaphthalene, 2,6-dihydroxynaphthalene, 1,5-dihydroxynaphthalene, 4-methyl-1-naphthol, 2-methyl-1-naphthol, 8-methyl-2-naphthol, 5-methyl-2-naphthol, 4-ethyl-1-naphthol, 5-ethyl-1-naphthol, 8-ethyl-2-naphthol, 5-ethyl-2-naphthol, 5-butyl-1-naphthol, 4-chloro-1-naphthol, 5-chloro-1-naphthol, 6-chloro-1-naphthol, 4-bromo-1-naphthol, 6-bromo-1-naphthol, 4-chloro-2-naphthol, 5-bromo-2-naphthol, 6-bromo-2-naphthol, 7-chloro-2-naphthol, 5-methoxy-1-naphthol, 5-methoxy-2-naphthol, 5-ethoxy-1-naphthol, 5-ethoxy-2-naphthol, etc, preferably 1-naphthol and 2-naphthol.

In formula (IV) , R preferably represents a chlorine atom, bromine atom, iodine atom, hydroxyl group or a lower alkoxy group containing 4 or less carbon atoms. With alkoxy groups containing 5 or more carbon atoms, the reaction is slow. Preferred examples of the biphenyl derivative of formula (IV) include 4,4'-bis(chloromethyl)biphenyl, 4,4'-bis(bromomethyl)biphenyl, 4,3-bis (chloromethyl)biphenyl, 3,3'-bis(chloromethyl)biphenyl, 4,4'-bis,(hydroxymethyl) biphenyl, 4,4'-bis(methoxymethyl)biphenyl, 3,3'-bis (hydroxymethyl)biphenyl, 3,3-bis (methoxymethyl) biphenyl, 4,4'-bis (ethoxymethyl) biphenyl, etc.

The acid catalyst which can be used in the above condensation reaction includes inorganic or organic acids, for example, mineral acids such as hydrochloric acid, sulfuric acid, phosphoric acid; organic sulfonic acids such as methanesulfonic acid, p-toluenesulfonic acid; as well as Friedel-Crafts catalysts such as zinc chloride, aluminium chloride, cupric chloride, ferric chloride; sulfuric acid esters such as dimethyl sulfate, diethyl sulfate; trifluoromethanesulfonic acid; boron trifluoride; oxalic acid; and they may be used alone or in combination. The acid catalyst is preferably used in an amount of 0.1 to 30% by weight of the compound of formula (IV). The naphthol is usually used 0.5 to 20.0 times, preferably 2 to 10 times in molar excess of the compound of formula (IV).

The reaction may be carried out in the absence or presence of a solvent such as benzene, toluene, methyl isobutyl ketone, etc. The reaction temperature is preferably 40° to 180° C., and the reaction time is preferably 1 to 8 hours. After completion of the reaction, the catalyst used and/or acid produced are washed with water or otherwise removed, and the solvent and excessive naphthol are removed under reduced pressure to give the intended resin of formula (II).

Thus obtained resin represented by formula (II) includes the resins represented by formulae (V) and (VI):

The reaction may be proceeded while removing the water produced by the reaction from the reaction system. After completion of the reaction, by-produced salt is washed with water, filtered or otherwise removed, to give the epoxy resin represented by formula (III).

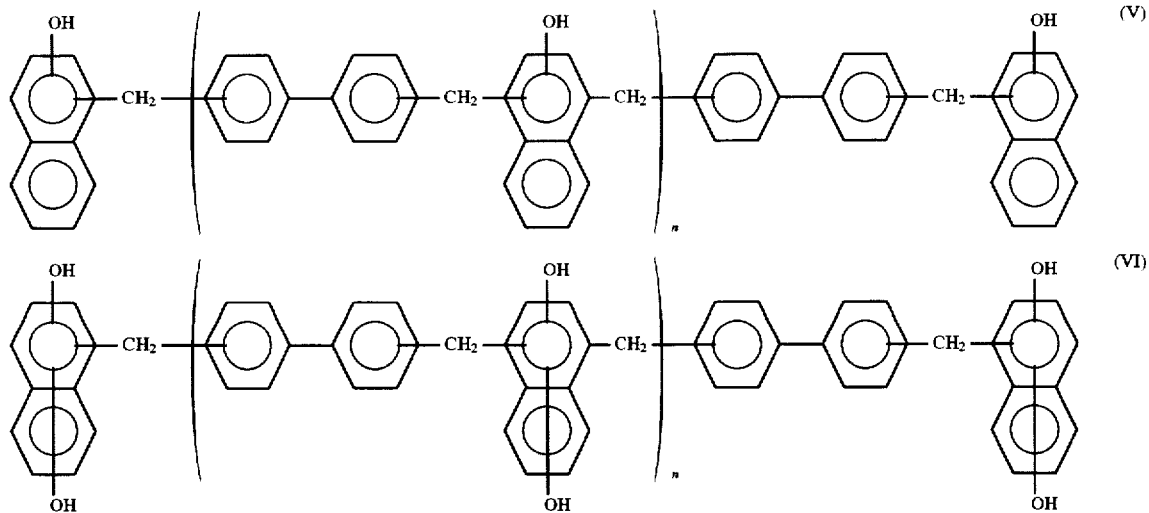

wherein n represents a mean value and ranges from 0 to 10.

Then, thus obtained resin of formula (II) can be reacted with an epihalohydrin compound in the presence of a basic compound to readily give the epoxy resin represented by formula (III). Examples of the epihalohydrin compound include epichlorohydrin, epibromohydrin, epiiodohydrin or mixtures thereof, among which epichlorohydrin is industrially preferable.

The reaction between the resin of formula (II) and an epihalohydrin compound is carried out by known methods.

For example, the resin of formula (II) is reacted with an epihalohydrin compound in molar excess of the hydroxyl equivalent of the resin in the presence of a quaternary ammonium salt such as tetramethylammonium chloride, tetramethylammonium bromide, triethylammonium chloride; or an alkali metal hydroxide such as sodium hydroxide, potassium hydroxide, etc.

When a quaternary ammonium salt is used, the reaction often stops at the stage of ring-opening addition reaction. Then, one of the above alkali metal hydroxides is added to cause a ring-closing reaction.

If an alkali metal hydroxide is initially added, the ring-opening addition reaction and ring-closing reaction may occur at the same time.

The proportion of the epihalohydrin compound used is usually 1 to 50 moles, preferably 3 to 15 moles per 1 hydroxyl equivalent of the compound represented by formula (II). The reaction may be promoted by alcohols such as methanol; acetone; or aprotic polar solvents such as dimethyl sulfoxide, dimethyl sulfon, dimethylformaldehyde, preferably dimethyl sulfoxide.

The amount of the alkali metal hydroxide used is usually 0.8 to 1.5 moles, preferably 0.9 to 1.3 moles per 1 hydroxyl equivalent of the resin of formula (II) When a quaternary ammonium salt is used, the amount thereof is usually 0.001 to 1.0 moles, preferably 0.005 to 0.5 moles per 1 hydroxyl equivalent of the resin represented by formula (II) . The reaction temperature is usually 30° to 130° C., preferably 40° to 120° C. The reaction time is usually 1 to 10 hours, preferably 2 to 8 hours.

Then, the epoxy resin compositions containing an epoxy resin as component (A) and a hardener as component (B) will be explained.

In the epoxy resin compositions as defined in (7) (8), (10), (11) and (12) above, the epoxy resin represented by formula (III) according to this invention may be used as component (A) alone or in combination with other epoxy resins. In the latter case, the proportion of the epoxy resin represented by formula (III) according to this invention in the total amount of epoxy resins is preferably 30% by weight or more, especially 50% by weight or more.

Epoxy resins which can be used in combination with the epoxy resin represented by formula (III) according to this invention include bisphenol A-type epoxy resins, bisphenol F-type epoxy resins, bisphenol S-type epoxy resins, alicyclic epoxy resins, biphenyl epoxy resins, novolak-type epoxy resins, among which novolak-type epoxy resins are especially advantageous in respect of heat resistance.

The novolak-type epoxy resins include, for example, cresol novolak-type epoxy resins, phenol novolak-type epoxy resins, brominated phenol novolak-type epoxy resins. Epoxy resins which can be used in combination are not limited to those listed above, and only one or more than one of them may be chosen.

In the epoxy resin compositions as defined in (6) (8), (9), (11) and (12) above, the resin represented by formula (II) according to this invention serves as a hardener, and may be used as component (B) alone or in combination with other hardeners. In the latter case, the proportion of the resin represented by formula (II) according to this invention in the total amount of hardeners is preferably 30% by weight or more, especially 50% by weight or more.

Hardeners which can be used in combination with the resin represented by formula (II) according to this invention include polyamine-based hardeners such as aliphatic polyamines, aromatic polyamines, polyamide polyamines; acid anhydride-based hardeners such as hexahydrophthalic anhydride, methyltetrahydrophthalic anhydride; phenol-based hardeners such as phenol novolak, cresol novolak; Lewis acids such as boron trifluoride, or their salts;

dicyandiamides. etc., but are not limited to these examples. And only one or more than one of them may be chosen.

In the epoxy resin compositions as defined in (6), (9) and (12) above, the epoxy resin as component (A) includes those listed above, in addition to the epoxy resin represented by formula (III) according to this invention.

In the epoxy resin compositions as defined in (7) (10) and (12) above, the hardener as component (B) includes those listed above, in addition to the resin of formula (II) according to this invention.

In the epoxy resin compositions according to this invention, the amount of the hardener as component (B) used is preferably 0.5 to 1.5 equivalents, especially 0.6 to 1.2 equivalents per 1 epoxy equivalent of the epoxy resin of component (A).

Various known cure accelerators may be used, including as non-limitative examples, imidazole compounds such as 2-methylimidazole, 2-ethylimidazole; tertiary amine compounds such as 2-(dimethylaminomethyl)phenol; triphenylphosphine compounds, etc. The amount of the cure accelerator used is preferably 0.01 to 15 parts by weight, especially 0.1 to 10 parts by weight based on 100 parts by weight of the epoxy resin of component (A).

If necessary, the epoxy resin compositions according to this invention further contain known additives including inorganic fillers such as silica, alumina, talc, glass fibers; surface-treating agents for fillers such as silane coupling agent; release agents; pigments; etc.

The epoxy resin compositions according to this invention are obtained by homogeneously mixing individual components. The epoxy resin compositions according to this invention are usually precured at temperatures between 130° and 170° C. for 30 to 300 seconds and then postcured at temperatures between 150° and 200° C. for 2 to 10 hours, to proceed a curing reaction enough to afford the cured products according to this invention.

Thus obtained cured products show excellent performances procured by all of the three properties, i.e. they have low water absorption and high adhesion while maintaining heat resistance.

Accordingly, the resins according to this invention can be used epoxy resins or hardeners in a wide field requiring heat resistance, low water absorption and high adhesion. Specifically, they are useful as constituents in any kind of electric and electronic materials such as insulating materials, laminated sheets, sealing materials, etc. They can also be used in the field of molding materials, composite materials, etc.

The effects become more remarkable by using the epoxy resin represented by formula (III) according to this invention as an epoxy resin of component (A) and the resin represented by formula (II) according to this invention as a hardener of component (B). Because of their low softening point despite of the presence of naphthalene rings, the resins of formulae (II) and (III) according to this invention can undergo known molding methods such as transfer molding, at good workability.

|EXAMPLE|

The following examples illustrate this invention, but are not construed as limiting the scope of this invention.

Example 1

In a flask equipped with a thermometer, cooling tube, dropping funnel and stirrer were placed 251 g (1.0 mol) of 4,4'-bis(chloromethyl)biphenyl, 864 g (6.0 mol) of 1-naphthol and 500 ml of mehtyl isobutyl ketone and stirred at room temperature with nitrogen-blowing. To this mixture was slowly added 2.8 g of p-toluenesulfonic acid with caution against heat evolution so that the liquid temperature may not exceed 50° C.

Figure 1:
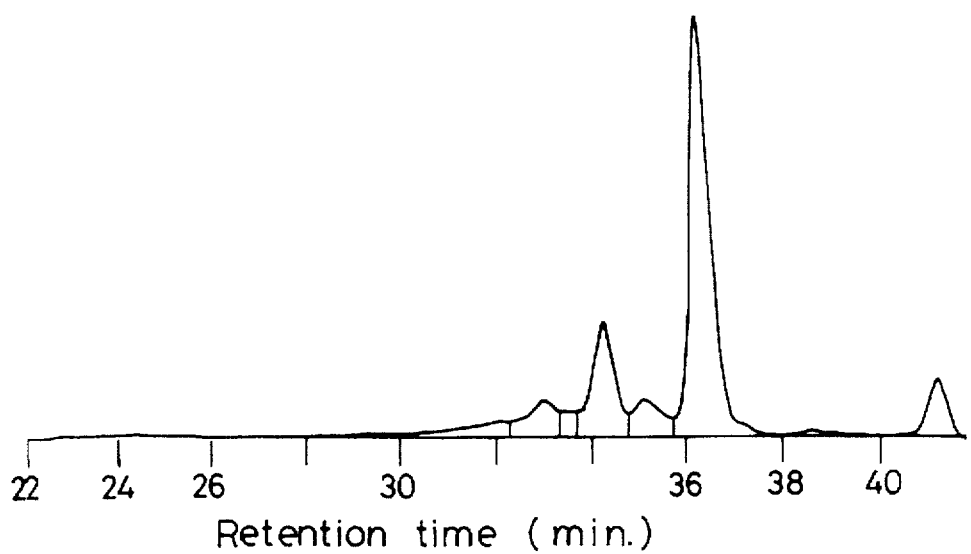
FIG. 1 shows a molecular weight distribution profile of the product (A-1) obtained by Example 1.

Then, the mixture was heated to 110° C. and reacted for 2 hours. After completion of the reaction, further 500 ml of methyl isobutyl ketone was added and the mixture was transferred to a separating funnel and washed with water. After the mixture was washed with water until the washings showed the neutrality, the solvent and unreacted material were removed from the organic layer under reduced pressure to give 471 g of a resin (A-1) represented by formula (II) according to this invention wherein all of X represent a hydrogen atom. The softening point (measured by JIS K2425 ring and ball test) was 104.3° C. and the hydroxyl equivalent (g/eq) was 241. Analysis of this product (A-1) in tetrahydrofuran as solvent by GPC analyzer specified below gave the molecular weight distribution profile as shown in FIG. 1. The value of n in formula (II) was 0.2.

GPC analyzer

Liquid feeding pump: LC-6000 (manufactured by Hitachi);

Column: GPC KF-803 (one column)+GPC KF-802.5 (two columns)+GPC KF-802 (one column) (manufactured by Showa Denko);

Column temperature: 40° C.;

Solvent: THF 1 ml/min;

Detector: RI ERC-7510 (manufactured by Elma Optics);

Data processor: D-2500 (manufactured by Hitachi).

The retention time to reach a main peak of the product (A-1) under the above analysis conditions correponded to the molecular weight of a four-nuclei substance consisting of one biphenyl and 2 naphthols, by comparison with a calibration curve using polystyrene as standard. This peak element supposed to be a four-nuclei substance was taken out and analyzed by mass spectrum (FAB-MS). The result showed M$^+$ 466, and this element was thus identified as the four-nuclei substance represented by formula (VII) below:

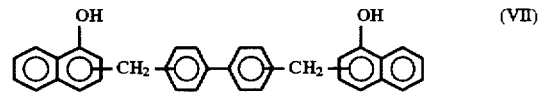

Example 2

The same procedure as described in Example 1 was conducted except that the amount of 1-naphthol was changed to 432 g (3.0 mol), to give 450 g of a product (A-2) of formula (II) according to this invention wherein all of X represent a hydrogen atom. The softening point of the product (A-2) was 113° C. and the hydroxyl equivalent (g/eq) was 255. The value of n in formula (II) was 0.8 by GPC analysis.

Example 3

In a reactor equipped with a thermometer, stirrer, dropping funnel and separator of produced water were placed 241 g of the product (A-1) obtained by Example 1 and 460 g of epichlorohydrin, and the air in the reactor was replaced with nitrogen, and then 85 g of a 48% aqueous sodium hydroxide solution was added dropwise over 5 hours. During dropwise-addition, produced water and the water of the aqueous sodium hydroxide solution were continuously removed from the reaction system by azeotropy with epichlorohydrin under the conditions at the reaction temperature of 60° C. and pressure between 100 and 150 mmHg, then epichlorohydrin was brought back to the system.

After excessive unreacted epichlorohydrin was recovered under reduced pressure, 700 ml of methyl isobutyl ketone was added and the mixture was washed with 100 ml of water until the aqueous layer showed the neutrality. Methyl isobutyl ketone was removed from the organic layer under reduced pressure, and then 700 ml of methyl isobutyl ketone was added again to redissolve the mixture therein. To the resulting methyl isobutyl ketone solution was added 20 g of a 20% aqueous sodium hydroxide solution and the mixture was reacted at the reaction temperature of 70° C. for 2 hours.

After completion of the reaction, the mixture was washed with water until the aqueous layer showed the neutrality, and methyl isobutyl ketone was removed from the oil layer under reduced pressure to give 282 g of a pale yellow solid (B-1). The softening point (JIS K2425) of the product (B-1) which was an epoxy resin of formula (III) according to this invention wherein all of Y represent a hydrogen atom and n=0.2 was 87.2° C. and the epoxy equivalent (g/eq) was 316.

Figure 2:
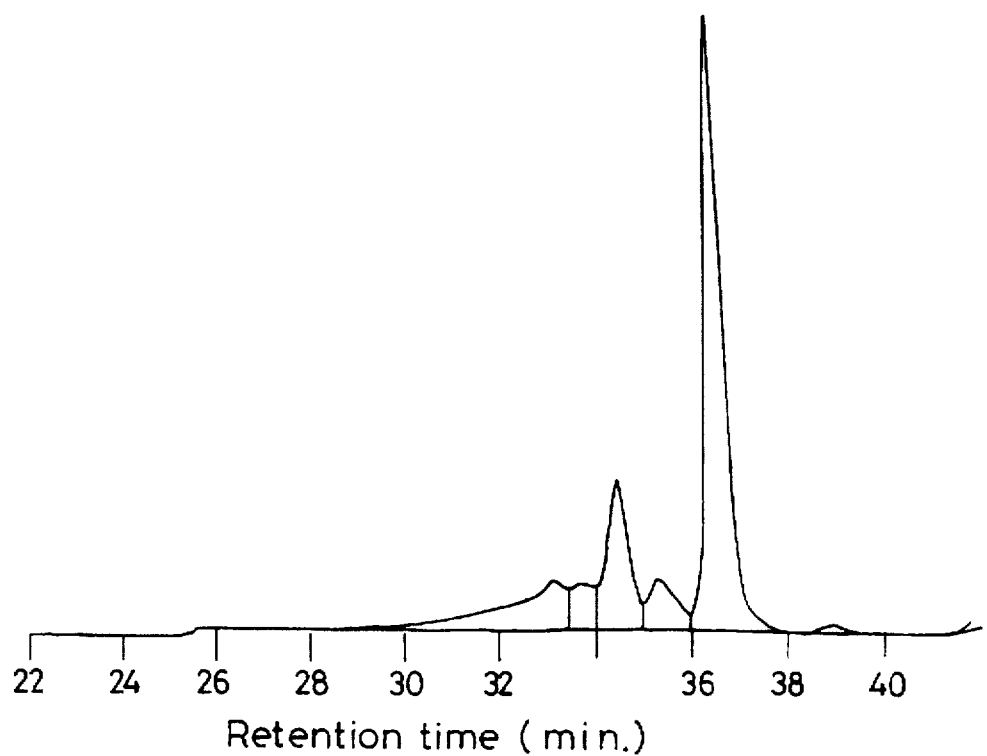
FIG. 2 shows a molecular weight distribution profile of the product (B-1) obtained by Example 3.

Analysis of this epoxy resin (B-1) by liquid chromatography (GPC, under the same analysis conditions as those of the above resin (A-1)) gave the molecular weight distribution profile as shown in FIG. 2. A peak element supposed to be a four-nuclei substance was taken out and analyzed by mass spectrum (FAB-MS). The result showed M⁺ 578, and this element was thus identified as a four-nuclei substance represented by the following formula (VIII):

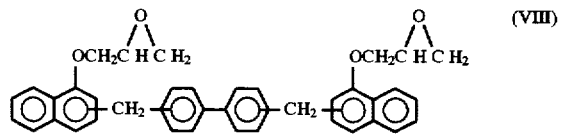

Example 4

The same procedure as described in Example 3 was conducted except that the product (A-1) was replaced by 235 g of the product (A-2) (hydroxyl equivalent (g/eq)=235) obtained by Example 2 to give 271 g of a product (B-2). The softening point of the product (B-2) which was an epoxy resin of formula (III) according to this invention wherein all of Y represent a hydrogen atom and n=0.8 was 91.2° C., and the epoxy equivalent (g/eq) was 336.

Example 5

In a reactor equipped with a thermometer, stirrer and dropping funnel were placed 241 g of the product (A-1) obtained by Example 1, 460 g of epichlorohydrin and 239 g of dimethyl sulfoxide, and the air in the reactor was replaced with nitrogen, and then 40 g of sodium hydroxide was gradually added in a water bath at 30° C. The reaction was carried out at 30° C. for 5 hours, at 50° C. for 2 hours and at 70° C. for 1 hour with caution against heat evolution. Then, the mixture was washed with water until the aqueous layer showed the neutrality. Then, epichlorohydrin and dimethyl sulfoxide were removed from the oil layer under reduced pressure. Then, 700 g of methyl isobutyl ketone was added to redissolve the mixture therein.

To the resulting methyl isobutyl ketone solution was added 20 g of a 20% aqueous sodium hydroxide solution to cause a reaction at the reaction temperature of 70° C. for 2 hours. After completion of the reaction, the mixture was washed with water until the aqueous layer showed the neutrality, methyl isobutyl ketone was removed from the oil layer under reduced pressure to give 285 g of a pale yellow solid (B-3). The softening point of the product (B-3) which was an epoxy resin of formula (III) according to this invention wherein all of Y represent a hydrogen atom and n=0.2 was 85.4° C., and the epoxy equivalent (g/eq) was 310.

Example 6

The same procedure as described in Example 5 was conducted except that the product (A-1) was replaced by 235 g of the product (A-2) obtained by Example 2 to give 277 g of a product (B-4). The softening point of the product (B-4) which was an epoxy resin represented by formula (III) according to this invention wherein all of Y represent a hydrogen atom and n=0.8 was 88° C., and the epoxy equivalent (g/eq) was 325.

Examples 7 and 8

The product (A-1) or (A-2) obtained by Example 1 or 2 as a hardener; cresol novolak-type epoxy resin EOCN-1020 as an epoxy resin; and 2-methylimidazole as a cure accelerator were mixed in the proportions shown as parts by weight in Table 1 and roll-milled at 70° to 80° C. for 15 minutes. After cooled, the mixture was ground, tabletted, molded by a transfer molding machine, then precured at 160° C. for 2 hours and postcured at 180° C. for 8 hours to give a cured product (test piece) according to this invention. The water absorption and adhesion of this cured product were determined. The results are shown in Table 1.

Water absorption

Test piece (Cured product): disc form in diameter 50 mm and thickness 3 mm;

Conditions: measured by an increase of the weight (% by weight) after boiled in water at 100° C. for 20 hours.

Adhesion

The bond strength was estimated by tensile shear according to ASTM D1002.

The adhesion was evaluated as follows:

| Measured value (kg/cm²) | Evaluation |
|---|---|
| <40 | Δ |
| 40 to 80 | ○ |
| 80< | ◎ |

Examples 9 and 10

The product (A-1) or (A-2) obtained by Example 1 or 2 as a hardener; the product (B-1) or (B-2) obtained by Example 3 or 4 as an epoxy resin; and 2-methylimidazole as a cure accelerator were mixed in the proportions shown as parts by weight in Table 1 and tested for the properties of the cured product according to this invention in the same way as in Examples 7 and 8. The results are shown in Table 1.

Examples 11 and 12

Phenol novolak resin PN(H-1) as a hardenrer; the product (B-1) or (B-2) obtained by Example 3 or 4 as an epoxy resin; and 2-methylimidazole as a cure accelerator were mixed in the proportions shown as parts by weight in Table 2 and tested for the properties of the cured product according to this invention in the same way as in Examples 7 and 8. The results are shown in Table 2.

Comparative Examples 1 to 3

Phenol novolak resin (PN(H-1)) as a hardener; cresol novolak resin (EOCN1020), polyepoxidized compound (EPPN502) of polyphenol obtained by condensation of aromatic aldehyde with phenol or bisphenol-type epoxy resin (EPOMIC R301) as an epoxy resin; and 2-methylimidazole as a cure accelerator, all commercially available products, were mixed in the proportions shown as parts by weight in Table 3 and evaluated for the comparative cured product by the same procedure as described in Examples 7 and 8. The results are shown in Table 3.

The commercially available hardener and epoxy resins incorporated are as follow:

PN(H-1)
  Phenol novolac resin (manufactured by Nippon Kayaku); Hydroxyl group equivalent (g/eq) 106;
  Softening point 85° C.

EOCN1020
  Cresor novolak-type epoxy resin (manufactured by Nippon Kayaku);
  Epoxy equivalent (g/eq) 200;
  Softening point 65° C.

EPOMIC R-301
  Bisphenol A-type epoxy resin (manufactured by Mitsui Petrochemical Epoxy, Co. Ltd.);
  Epoxy equivalent (g/eq) 470;
  Softening point 68° C.

EPPN502
  Polyepoxy compound (manufactured by Nippon Kayaku);
  Epoxy equivalent (g/eq) 168;
  Softening point 70° C.

TABLE 1

|  | Example | | | |
|---|---|---|---|---|
|  | 7 | 8 | 9 | 10 |
| Hardener: | | | | |
| Product (A-1) | 241 | — | 241 | — |
| Product (A-2) | — | 235 | — | 235 |
| Epoxy resin: | | | | |
| Product (B-1) | — | — | 316 | — |
| Product (B-2) | — | — | — | 312 |
| EOCN-1020 | 200 | 200 | — | — |
| Cure accelerator (2-Methylimidazole) | 2.0 | 2.0 | 3.2 | 3.1 |
| Water absorption (%) | 0.76 | 0.79 | 0.62 | 0.64 |
| Adhesion | ◎ | ◎ | ◎ | ◎ |

TABLE 2

|  | Example | |
|---|---|---|
|  | 11 | 12 |
| Hardener: | | |
| PN(H-1) | 106 | 106 |
| Epoxy resin: | | |
| Product (B-1) | 316 | — |
| Product (B-2) | — | 312 |
| Cure accelerator (2-Methylimidazole) | 2.9 | 3.1 |

TABLE 2-continued

|  | Example | |
|---|---|---|
|  | 11 | 12 |
| Water absorption (%) | 0.66 | 0.68 |
| Adhesion | ○ | ○ |

TABLE 3

|  | Comparative example | | |
|---|---|---|---|
|  | 1 | 2 | 3 |
| Hardener: | | | |
| PN(H-1) | 106 | 106 | 106 |
| Epoxy resin: | | | |
| EOCN-1020 | 200 | — | — |
| EPOMIC R-301 | — | 470 | — |
| EPPN-502 | — | — | 168 |
| Cure accelerator (2-Methylimidazole) | 2.0 | 4.7 | 1.7 |
| Water absorption (%) | 1.40 | 1.20 | 2.00 |
| Adhesion | ○ | ◎ | △ |

[EFFECT OF THE INVENTION]

The resins of formulae (II) and (III) according to this invention have high refractive indices, and the cured products thereof show a water absorption remarkably lower than conventional resins and better adhesion without deteriorating glass transition temperture and heat deformation temperature which are indicative of heat resistance.

Accordingly, the resins of this invention satisfactorily meet the recent requirements for high heat resistance, low water absorption and high adhesion, and thanks to these performances, they are very useful in a wide field, particularly as sealing materials for electric and electronic components, molding materials, optical materials or laminating materials.

We claim:

1. A resin represented by formula (I):

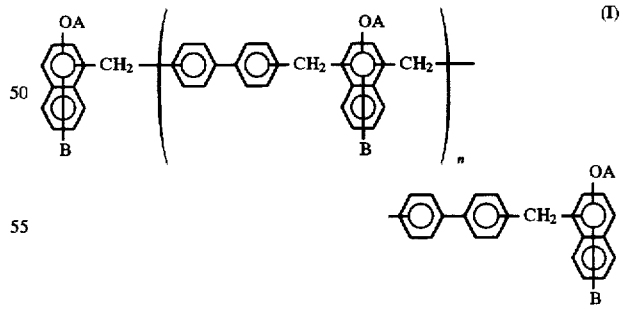

wherein A represents a hydrogen atom or a glycidyl group; B each independently represents a hydrogen atom, halogen atom, hydroxyl group, glycidyloxy group, or lower alkyl or lower alkoxy group containing 5 or less carbon atoms; and n represents a mean value and ranges from 0 to 10.

2. A resin as defined in claim 1, represented by formula (II):

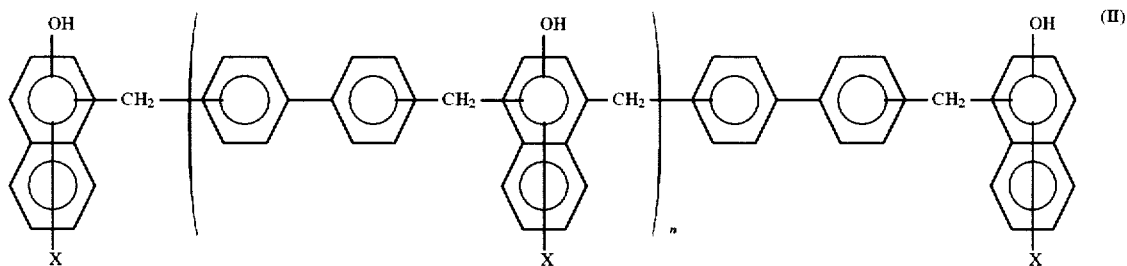

wherein n represents a mean value and ranges from 0 to 10; X each independently represents a hydrogen atom, halogen atom, hydroxyl group, or lower alkyl or lower alkoxy group containing 5 or less carbon atoms.

3. A resin as defined in claim 1, represented by formula (III):

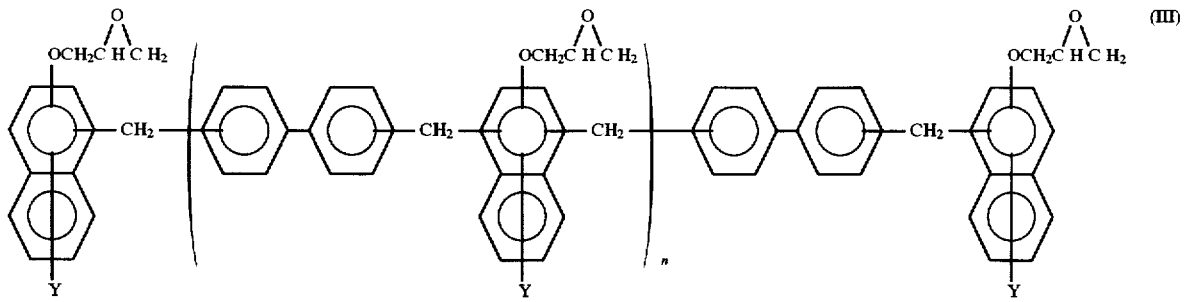

wherein n represents a mean value and ranges from 0 to 10; Y each independently represents a hydrogen atom, halogen atom, glycidyloxy group, or lower alkyl or lower alkoxy group containing 5 or less carbon atoms.

4. A resin as defined in claim 2 represented by formula (II) wherein all of X represent a hydrogen atom.

5. A resin as defined in claim 3 represented by formula (III) wherein all of Y represent a hydrogen atom.

6. An epoxy resin composition comprising:

(A) an epoxy resin; and (B) a resin as defined in claim 2.

7. An epoxy resin composition comprising:

(A) a resin as defined in claim 3; and (B) a hardener.

8. An epoxy resin composition comprising:

(A) a resin represented by formula (III):

atom, glycidyloxy group, or lower alkyl or lower alkoxy group containing 5 or less carbon atoms, and (B) a resin as defined in claim 2.

9. An epoxy resin composition comprising:

(A) an epoxy resin, and (B) a resin as defined in claim 4.

10. An epoxy resin composition comprising:

(A) a resin as defined in claim 5, and (B) a hardener.

11. An epoxy resin composition comprising:

(A) a resin represented by formula (III):

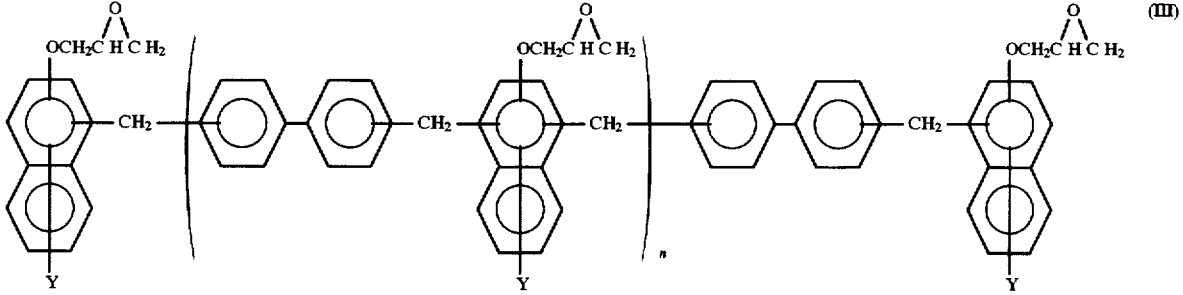

wherein n represents a mean value and ranges from 0 to 10; Y each independently represents a hydrogen atom, halogen

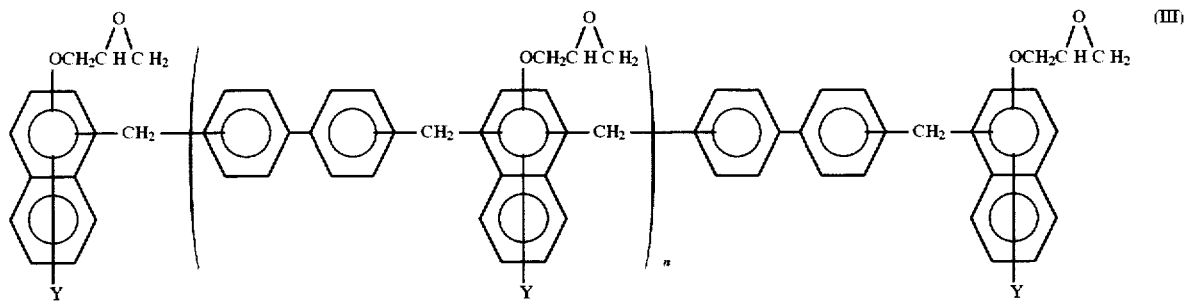

wherein n represents a mean value and ranges from 0 to 10 and each Y independently represents a hydrogen atom, and (B) a resin as defined in claim 4.

12. An epoxy resin composition as defined in claim 6, 7, 8, 9, 10 or 11, further containing a cure accelerator.

13. A cured product obtained by curing an epoxy resin composition as defined in claim 6, 7, 8, 9, 10, or 11.

14. A cured product obtained by curing an epoxy resin composition as defined in claim 12.

* * * * *